US008645564B2

(12) United States Patent
Templin

(10) Patent No.: US 8,645,564 B2
(45) Date of Patent: Feb. 4, 2014

(54) METHOD AND APPARATUS FOR CLIENT-DIRECTED INBOUND TRAFFIC ENGINEERING OVER TUNNEL VIRTUAL NETWORK LINKS

(75) Inventor: Fred L. Templin, North Bend, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 13/269,663

(22) Filed: Oct. 10, 2011

(65) Prior Publication Data

US 2013/0091196 A1    Apr. 11, 2013

(51) Int. Cl.
*G06F 15/16*    (2006.01)

(52) U.S. Cl.
USPC .......................................... 709/232; 709/240

(58) Field of Classification Search
USPC ......... 709/203, 217–219, 223–229, 232–234, 709/238–240; 455/436–444; 370/351–356
See application file for complete search history.

(56) References Cited

U.S. PATENT DOCUMENTS

| | | | |
|---|---|---|---|
| 7,305,481 B2 | 12/2007 | Blanchet et al. | |
| 7,657,642 B2 | 2/2010 | Blanchet | |
| 7,673,048 B1 | 3/2010 | O'Toole, Jr. et al. | |
| 7,764,700 B2 * | 7/2010 | Muirhead et al. | 370/401 |
| 7,843,918 B2 | 11/2010 | Osborne | |
| 2002/0075901 A1 * | 6/2002 | Perlmutter et al. | 370/468 |
| 2004/0006613 A1 * | 1/2004 | Lemieux et al. | 709/223 |
| 2006/0104262 A1 * | 5/2006 | Kant et al. | 370/352 |
| 2006/0253596 A1 * | 11/2006 | Barone et al. | 709/229 |
| 2008/0130637 A1 * | 6/2008 | Kant et al. | 370/389 |
| 2008/0159263 A1 * | 7/2008 | Kauppinen et al. | 370/352 |
| 2010/0106961 A1 | 4/2010 | Pei et al. | |
| 2011/0153822 A1 | 6/2011 | Rajan et al. | |

OTHER PUBLICATIONS

Intellectual Property Office Combined Search and Examination Report of Application No. GB1217943.8; Jan. 29, 2013; 3 pages.
F. Templin; The Internet Routing Overlay Network (IRON); Internet Research Task Force (IRTF); dated Mar. 2011; pp. 26.
R. Moskowitz et al.; Host Identity Protocol; Network Working Group; dated Apr. 2008; pp. 72.
F. Templin; The Subnetwork Encapsulation and Adaptation Layer (SEAL); Independent Submission; dated Feb. 2010; pp. 21.
D. Awduche et al.; Requirements for Traffic Engineering Over MPLS; Network Working Group; dated Sep. 1999; pp. 21.
D. Awduche et al.; Overview and Principles of Internet Traffic Engineering; Network Working Group; dated May 2002; pp. 50.
K. Kompella et al.; Link Bundling in MPLS Traffic Engineering (TE); Network Working Group; dated Oct. 2005; pp. 9.
D. Farinacci et al.; Locator/ID Separation Protocol (LISP); Network Working Group; dated Jul. 9, 2011; pp. 63.

* cited by examiner

*Primary Examiner* — Brendan Higa
(74) *Attorney, Agent, or Firm* — Armstrong Teasdale LLP

(57) ABSTRACT

A method for managing network traffic is described which includes receiving a traffic engineering specification at a Server from a Client, receiving a communication at the Server, a destination of the communication being the Client, and sending the communication from the Server to the Client via a tunnel virtual interface configured over one or more of Internet service provider (ISP) connections associated with the Client based on the traffic engineering specification, the tunnel virtual interface being a point of connection to a tunnel virtual network link.

24 Claims, 7 Drawing Sheets

METHOD AND APPARATUS FOR CLIENT-DIRECTED INBOUND TRAFFIC ENGINEERING OVER TUNNEL VIRTUAL NETWORK LINKS

BACKGROUND

The field of the disclosure relates generally to message traffic within computer networks, and more specifically, to method and apparatus for client-directed inbound traffic engineering over tunnel virtual network links.

A problem currently exists in regard to how to optimize inbound data communications traffic when a Client device (or simply "Client") configures a tunnel virtual network link over multiple available Internet Service Provider (ISP) connections. One example is the traffic coming from an Internetwork (for example, the global Internet, an enterprise network, a civil aviation network, a military network backbone etc.) into a Serving router (or simply "Server") which then forwards the data to the Client via a tunnel virtual network link configured over a plurality of ISP connections.

Existing solutions include "traffic shapers" which are typically managed by centralized entities such as ISP network administrators. However, management of traffic shapers in the network is typically made through ISP network management workstations or through explicit Server configurations within the ISP's network. This management methodology does not allow for end user Client customers to directly manage the ISP network traffic shapers, nor does it typically allow the Client to provide specific instructions for how it would like the Internetwork to distribute inbound traffic over the Client's plurality of ISP connections.

BRIEF DESCRIPTION

In one aspect, a method for managing network traffic is provided. The method includes receiving a traffic engineering specification at a Server from a Client, receiving a communication at the Server, a destination of the communication being the Client, and sending the communication from the Server to the Client via a tunnel virtual interface configured over one or more of Internetwork Service Provider (ISP) connections associated with the Client based on the traffic engineering specification, the tunnel virtual interface being a point of connection to a tunnel virtual network link.

In another aspect, a method for Client configured network communications is provided. The method includes creating a tunnel virtual interface from the Client to the Server, providing, from the Server to the Client, a Client Identifier (Client_ID), registering, from the Client to the Server, a set of ISP connection identifiers (ISP_IDs), providing, from the Client to the Server, a traffic engineering specification for network traffic to be directed to the Client, and distributing, at the Server, the network traffic destined for the Client according to the traffic engineering specification.

In still another aspect, a computer network having a Client and a Server is provided, where the Server is configured to receive a traffic engineering specification from the Client, receive a communication, via the Internetwork, a destination of the communication being the Client, and send the communication to said Client via a tunnel virtual interface configured over one or more of the Client's Internet service protocol (ISP) connections with the one or more of the Client's ISP connections associated with said Client based on the traffic engineering specification.

The features, functions, and advantages that have been discussed can be achieved independently in various embodiments or may be combined in yet other embodiments further details of which can be seen with reference to the following description and drawings.

DETAILED DESCRIPTION

Figure 1:
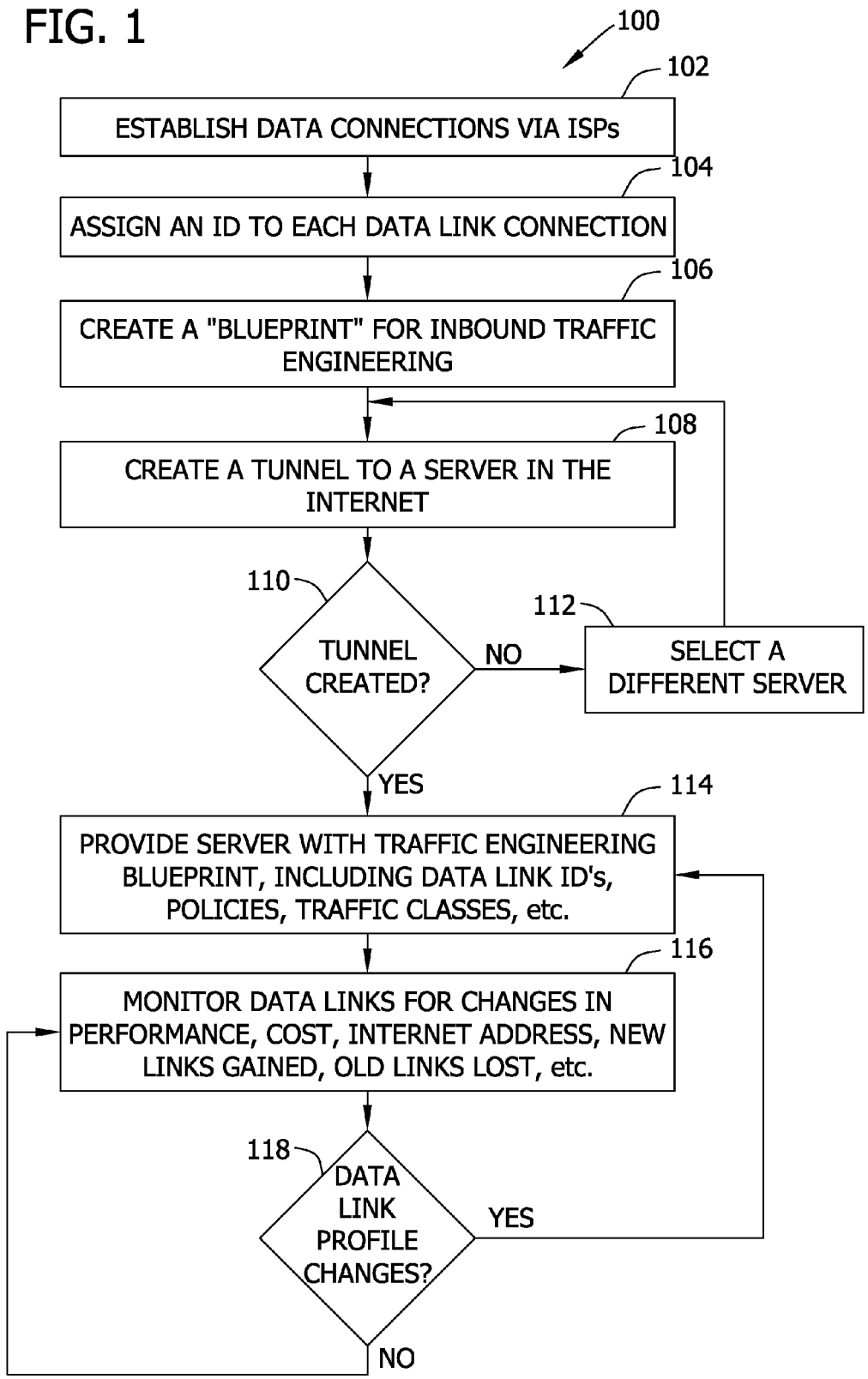
FIG. 1 is a flowchart illustrating the traffic engineering specification implementation process.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The described embodiments allow a computer network Client to register traffic engineering "blueprints" (or "specifications") with a Server for use in distributing inbound data communications over a tunnel virtual network link. In this context, a "tunnel virtual network link" is understood to be a data communications path enabled by the encapsulation of a virtual overlay network layer protocol packet (for example, "IPvY") within an Internet Service Provider (ISP) connection network layer protocol header (for example, "IPvX"), a "tunnel virtual interface" being a point of connection to the tunnel virtual network link.

The Server in turn ensures that data communications traffic to be delivered to the Client is engineered (or "shaped") according to the Client provided specification. The traffic engineering specification contains, for example specifications of the Client's attached ISP connections along with a set of instructions for how the Client wishes the server to distribute inbound traffic over those connections. During the registration, the Server assigns the Client a "Client Identifier (Client_ID)" to uniquely identify the Client, and the Client provides the Server with one or more "ISP Identifiers (ISP_ID)" to uniquely identify each of its ISP connections. The Client_ID and ISP_ID are then provided as additional tunnel encapsulation header fields in each packet exchanged between the Client and Server so that both parties can unambiguously associate the packets with the Client/Server registration. Most importantly, the Client_ID and ISP_IDs remain stable even if the Client's ISP connection network layer addresses change, as is often the case when the Client is a mobile device. Note that the Client and/or Server may also be a simple end system associated with a router, but for simplicity the case of the Client and Server functions occurring on the same devices as their respective router functions is described.

The traffic engineering specification further allows the Client to specify performance characteristics for the plurality of underlying ISP connections over which the tunnel virtual network link is configured. A method to control the inbound traffic from a public network to a private network from a Client residing in the private network is one result of the described embodiments.

Embodiments further allow for the Client to change the traffic engineering specification dynamically over time as network conditions change as well as control its own inbound traffic engineering profiles independently of all other Clients and without need for intervention from a centralized network manager. Such embodiments allow a Client that is connected to the network by multiple and diverse ISP connections to inform the Server how it would like its incoming traffic arriving on a tunnel virtual network link to be distributed over the underlying ISP connections.

FIG. 1 is a flowchart 100 illustrating the traffic engineering specification implementation process. Initially, the Client establishes connections 102 via an Internetwork service provider (ISP) and assigns an ISP_ID 104 to each ISP connection. A specification is created 106 for inbound traffic engineering and a tunnel is created 108 to a Server on the Internetwork.

If the tunnel 110 cannot be created, a different Server is selected 112 and another attempt to create a tunnel 108 is made. If the tunnel 110 is created, the Server provides the Client with a Client ID, and the Client provides the server 114 with an ISP_ID for each of its ISP connections as well as a traffic engineering specification including, but not limited to, the policies, traffic classes, costs, etc. associated with each ISP_ID. Continuing, the ISP connections are monitored 116, for example, for changes in performance, cost, ISP connection network layer address, any new ISP connections that are gained, and any old ISP connections that are lost. When this ISP connection profile changes 118, the Client provides the Server with an updated traffic engineering specification; otherwise, the monitoring 116 of ISP connections continues.

The traffic engineering specification contains specifications of the Client's attached ISP connections including, for example, a set of instructions for how the Client wishes the Server to distribute inbound tunneled traffic over those ISP connections. Such instructions may include for example, one or more of a specification of performance characteristics (e.g., throughput, delay, delay variance, etc.) for the plurality of underlying ISP connections over which the tunnel is configured, a specification of costs (e.g., per bit, per-connection, per-session, etc.) for the plurality of underlying ISP connections, a specification of client policies, etc.

Figure 2:
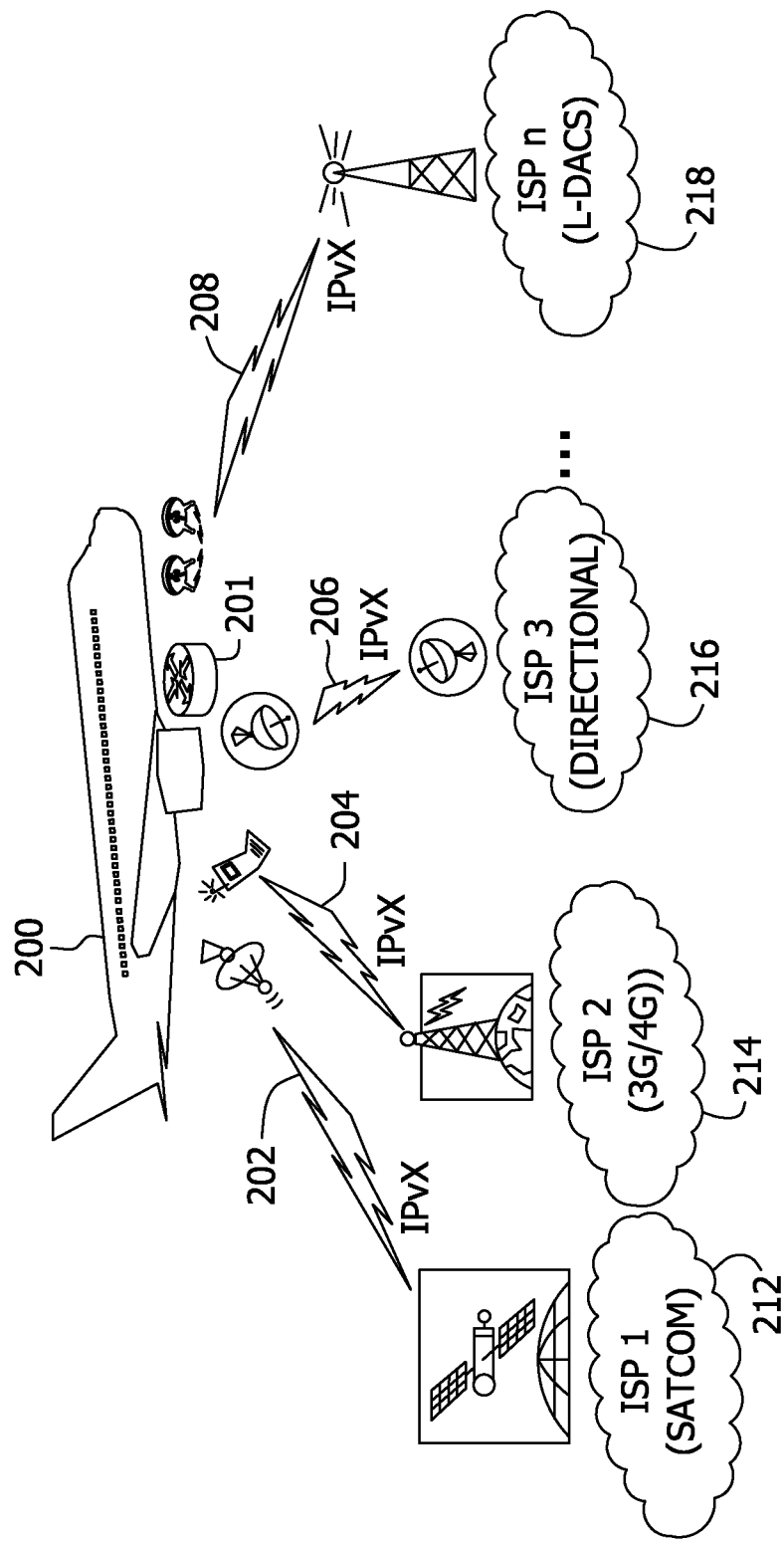
FIG. 2 illustrates that a Client deployed on a platform such as an aircraft can incorporate a number of ISP connections; each with its own ISP connection network layer address, depicted as "IPvX".

The embodiments are illustrated through an example. Currently, as shown in FIG. 2, an aircraft 200 incorporates a number of network communication data link devices such as radios and antennas. In a simple example, aircraft 200 provides a platform for a Client router (or simply "Client") 201, and also provides a satellite communications data link 202, a cellular data link (3G/4G) 204, a directional wireless data link 206, and an L-band digital aeronautical communications system data link 208. Data links 202, 204, 206, and 208 connect to ISPs, as shown by networks 212, 214, 216, and 218. In such a configuration, the ISP connection network layer addresses (depicted as "IPvX") are each associated with a corresponding ISP_ID chosen by the Client 201. As the aircraft 200 travels, the ISP connection network layer addresses assigned to data links 202, 204, 206, and 208 may change because, for example, the aircraft 200 moves out of range of cellular tower 204, and moves into range of another cellular tower (not shown). However, it is the ISP_ID, and not the ISP connection network layer address, that identifies the Client's ISP connection to the Server since the ISP_ID remains stable even if the network layer address changes.

Figure 3:
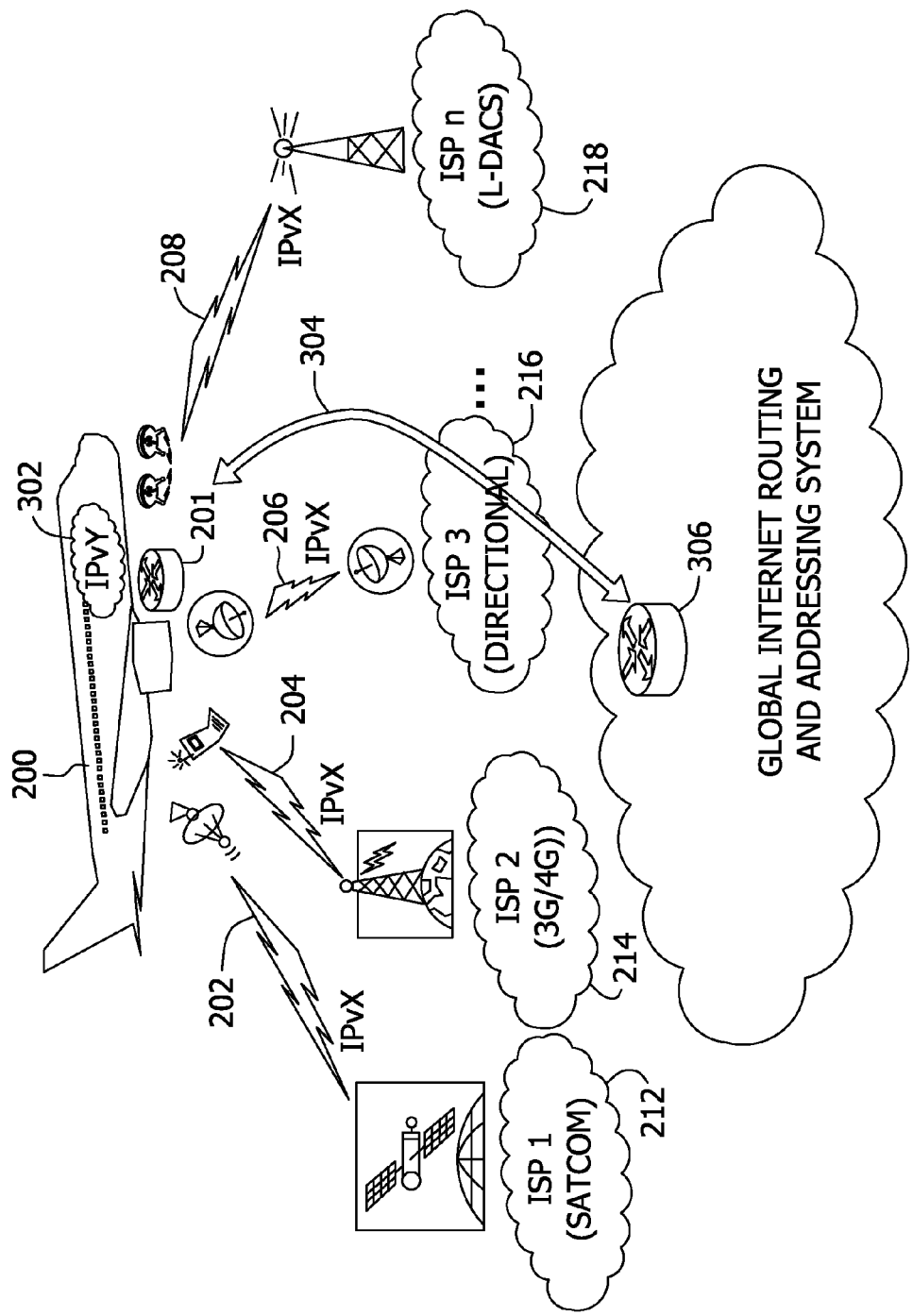
FIG. 3 illustrates an architecture where ISP connections with respect to a Client are handled using a Serving router located in the Internetwork, where the Server enables data communications for the Client's virtual overlay network layer protocol, depicted as "IPvY").

The architecture of FIG. 3 addresses this losing and gaining of ISP connections with respect to Client 201 in a different way through the incorporation of Serving router (or simply "Server") 306. Incorporation of the Server 306 is through an instruction 304 in which the Client 201 provides the Server 306 with a traffic engineering specification and a list of ISP IDs, while the Server 306 provides the Client 201 with a Client ID. Relevant to this disclosure, and referring to FIG. 3, the Client 201 is able to dictate through instruction 304 to the Server 306 how its ISP connections thereto are represented to Server 306. The Server 306 operates as a proxy for the Client 201 thereby specifying operating parameters for the respective ISP connections 202, 204, 206, and 208. The Client's traffic engineering specification further instructs the Server 306 how the various inbound data should be distributed across the various ISP connections.

The Client configures a virtual overlay network address 302 or prefix (depicted as "IPvY") and further dictates to the Serving router through a traffic engineering specification how it wants the various data distributed across the Client's various ISP connections. Referring again to FIG. 3, incorporation of the Server 306 establishes a tunnel virtual network link where the Client 201 receives a virtual overlay network layer address or prefix (depicted here as "IPvY") 302 that remains stable even though its ISP connection network layer addresses may change dynamically. As a result, Client 201 does not need to communicate its ISP connection changes 202, 204, 206, 208 (e.g., due to moving from one cellular tower to another) to correspondents in the Internetwork. Instead, the ISP connection changes are tracked internally within the Server 306 and the Client 201 is able to retain its virtual overlay network layer addresses or prefixes 302.

Figure 4:
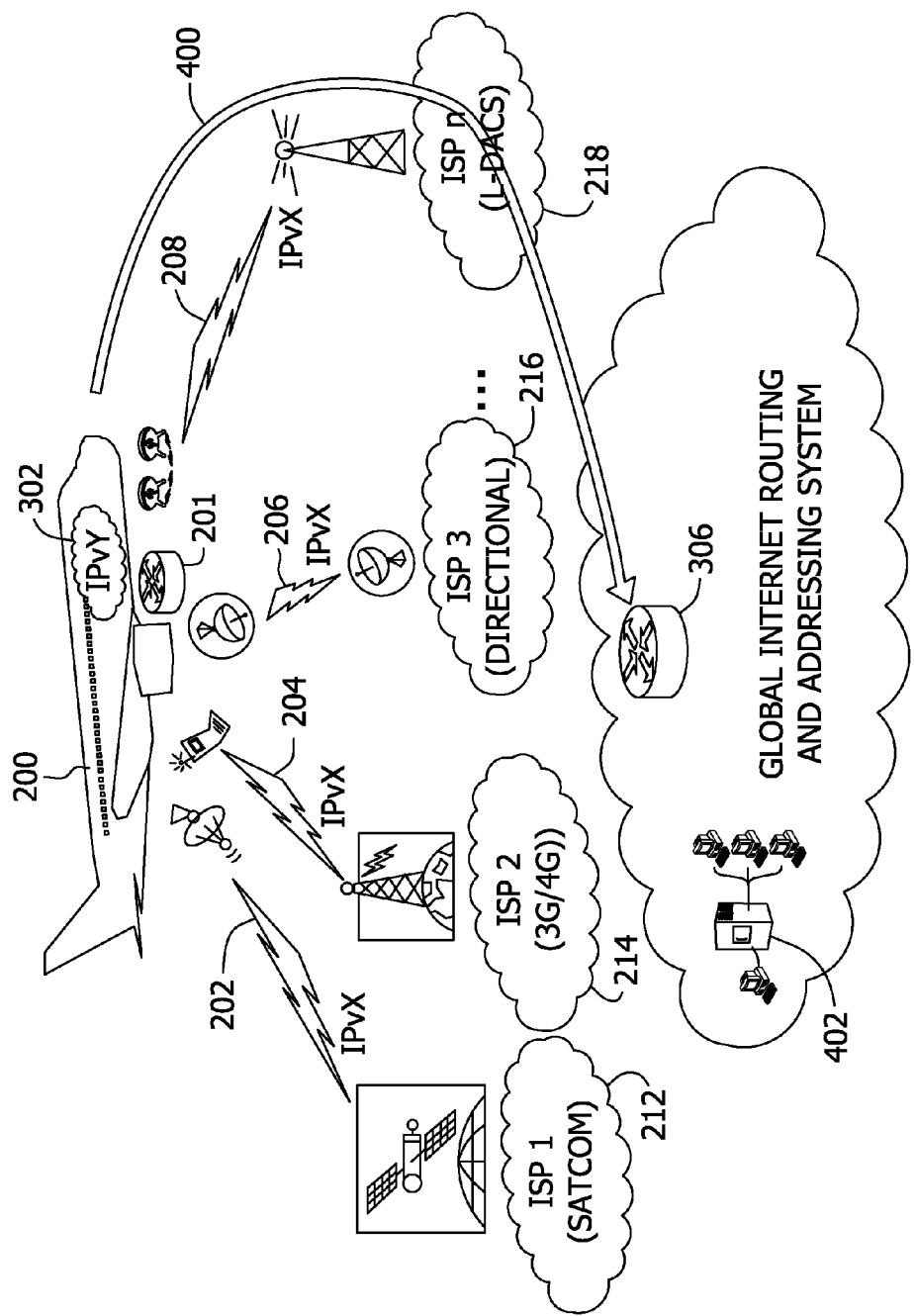
FIG. 4 illustrates the Client issuing a data communication over the tunnel virtual network link to the Server via the ISP connection of the Client's choosing.

As shown in FIG. 4, after Server 306 has been incorporated, Client 201 may send data communications via the tunnel virtual network link 400 to the Server 306 with a Website 402 in the Internetwork as the final destination. In the example of FIG. 4, Client 201 further selects ISP connection 208 as the outbound carrier for the tunnel virtual network link.

Figure 5:
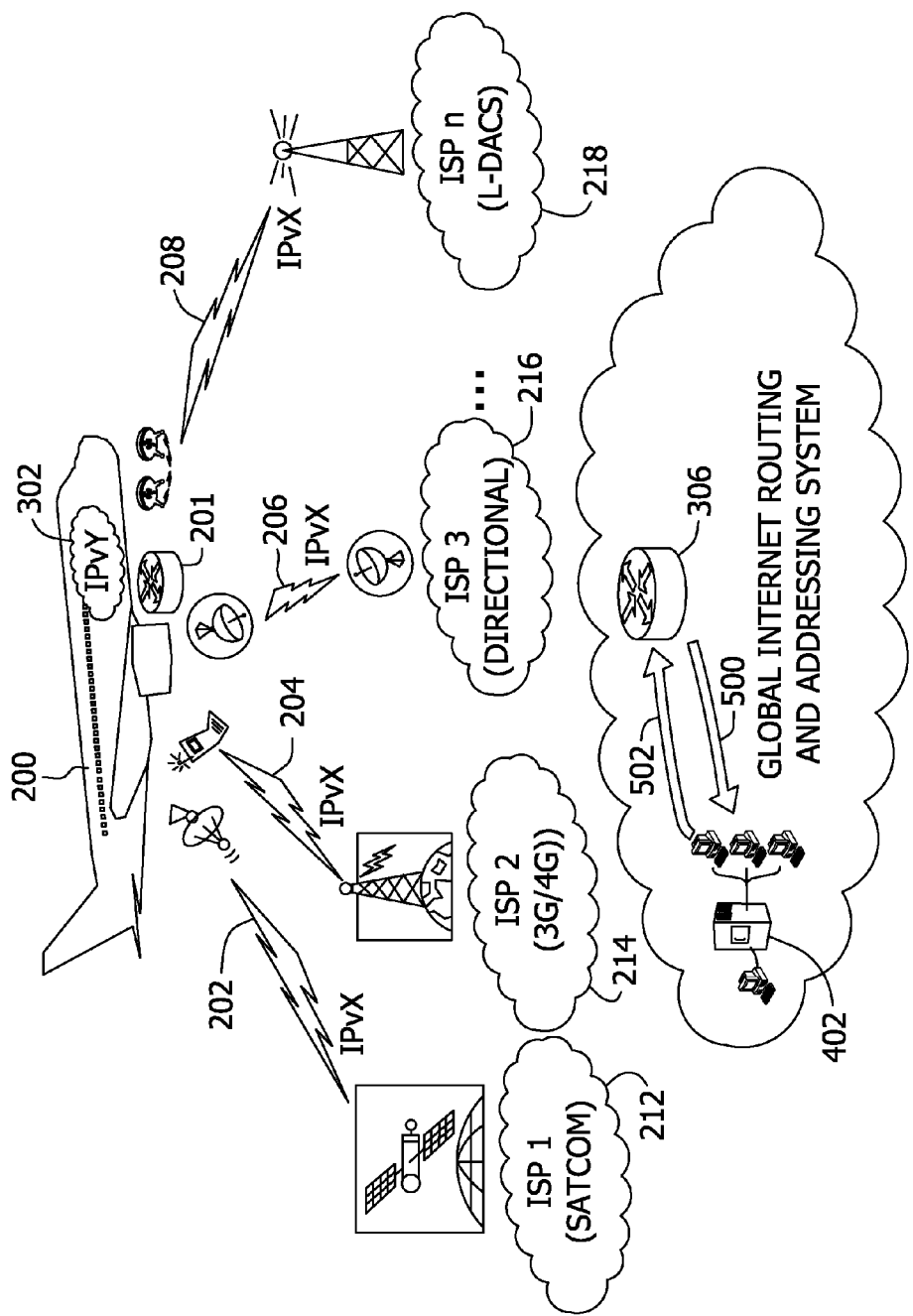
FIG. 5 illustrates the Server receiving the Client's data communication, and forwarding the data communication to a Website in the Internetwork, where the Website sends a return communication back to the Server.

As shown in FIG. 5, after Server 306 receives the data communication from Client 201, Server 306 forwards the communication 500 to the destination Internet Website 402. In turn, Website 402 sends a reply data communication 502 with the destination being the Client 201. The reply data communication will follow standard Internetwork routing until it is received by Server 306 acting as a proxy for Client 201.

Figure 6:
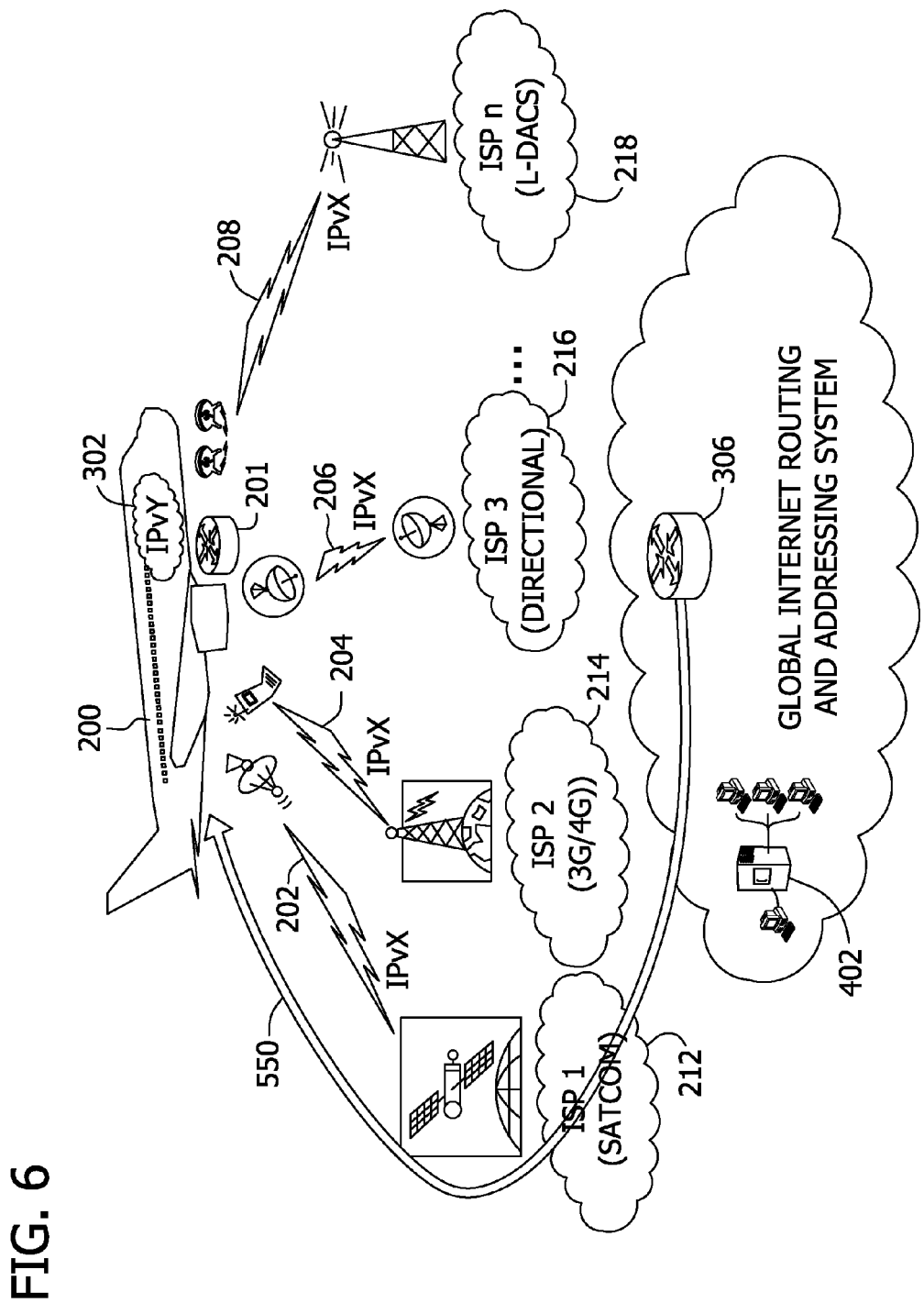
FIG. 6 illustrates the Server forwarding the data communication over the tunnel virtual network link to the Client via the ISP connection of the Client's choosing according to the Client's traffic engineering specification.

As shown in FIG. 6, Server 306 forwards the data communication from Website 402 with the final destination being Client 201 via the tunnel virtual network link 550. In the example of FIG. 6, Server 306 further selects ISP connection 202 as the inbound carrier for the tunnel virtual network link 550 based on the Client's traffic engineering specifications established when the Server 306 was incorporated. Note that the tunnel virtual network link 400 depicted in FIG. 4 is one and the same as the tunnel virtual network link 550 depicted in FIG. 6. By virtue of the traffic engineering specification enabled by this embodiment, however, the ISP paths taken by the tunnel virtual network link may be different in the inbound and outbound directions from the perspective of the Client 201.

At least one result and the technical effects are a method for managing network traffic that includes receiving a traffic engineering specification at a Server from a Client, receiving a communication at the Server, a destination of the communication being the Client, and sending the communication from the Server to the Client via a tunnel virtual network link configured over one or more of ISP connections associated with the Client based on the traffic engineering specification. The received traffic engineering specification is stored on the Server in one embodiment.

Receiving a traffic engineering specification includes sending the traffic engineering specification by the Client to the Server, where the specification includes one or more of the ISP connections associated with the Client, performance characteristics for the ISP connections associated with the Client, cost metrics for the ISP connections associated with the Client, etc. An update to the traffic engineering specification is sent from the Client to the Server in one embodiment, in response to a detected change in the network.

As described herein, a traffic engineering specification is provided by a Client from a client-side network to a Server in a dynamic fashion. As such, no centralized entity (e.g. ISP admin or network management workstation) is involved and there is no need for a fixed explicit server configuration within any ISP connection networks.

The process, as shown by FIGS. 2-6, can be expanded to multiple Clients as each Client can control its inbound traffic engineering profile independently of all other Clients. In the aircraft operation environment, reduced data communication costs with fleet customers can result and each aircraft in the fleet can control its inbound traffic profiles independently of others. However the aircraft example is only one application in which the described embodiments may be used, and such methods are broadly applicable to other applications.

In operation, a Server receives the traffic engineering specification from a Client. The Server is located somewhere on the Internetwork, in a physically-secured and high-availability configuration (for example, with an uninterruptible power supply), but it does not have to be physically cordoned off from the rest of the Internetwork. The Client authenticates itself to the Server. Once the Client has been authenticated, the Server will accept and act on the traffic engineering specification for the particular Client. In embodiments, the traffic engineering specification is not static, but can be dynamically re-negotiated as the Client's connectivity situation dynamically evolves. As such, the Client dynamically manages the Server's current copy of the traffic engineering specification, and updates the specification (and the Server) when changes are needed.

Network traffic arrives at the Server from the Internetwork. The Server ensures that data communications traffic to be delivered to the Client is engineered (or "shaped") according to the Client's traffic engineering specification, which provides a methodology for optimizing data communications traffic over the multiple available ISP connections of a Client, for example, wi-fi networks, cellular networks, satellite networks, and radio networks to name a few.

Embodiments of the Server described herein is both a computer and a router, and therefore referred to sometimes herein as a "Serving Router". In embodiments, the Server function and router function are maintained as separate entities, but expediency, the Server function and router function are described together herein.

The embodiments are different from a network administration model to a client-based model for traffic engineering as the model assumes that the client is uniquely positioned to know how it would like its inbound traffic to be engineered. This makes network administration trivial, since the Client can only do harm to itself and not to the rest of the network if it makes poor decisions. This is a much more effective model than a traditional network management based model, in which the network manager cannot know exactly what behavior each Client expects from the network.

Figure 7:
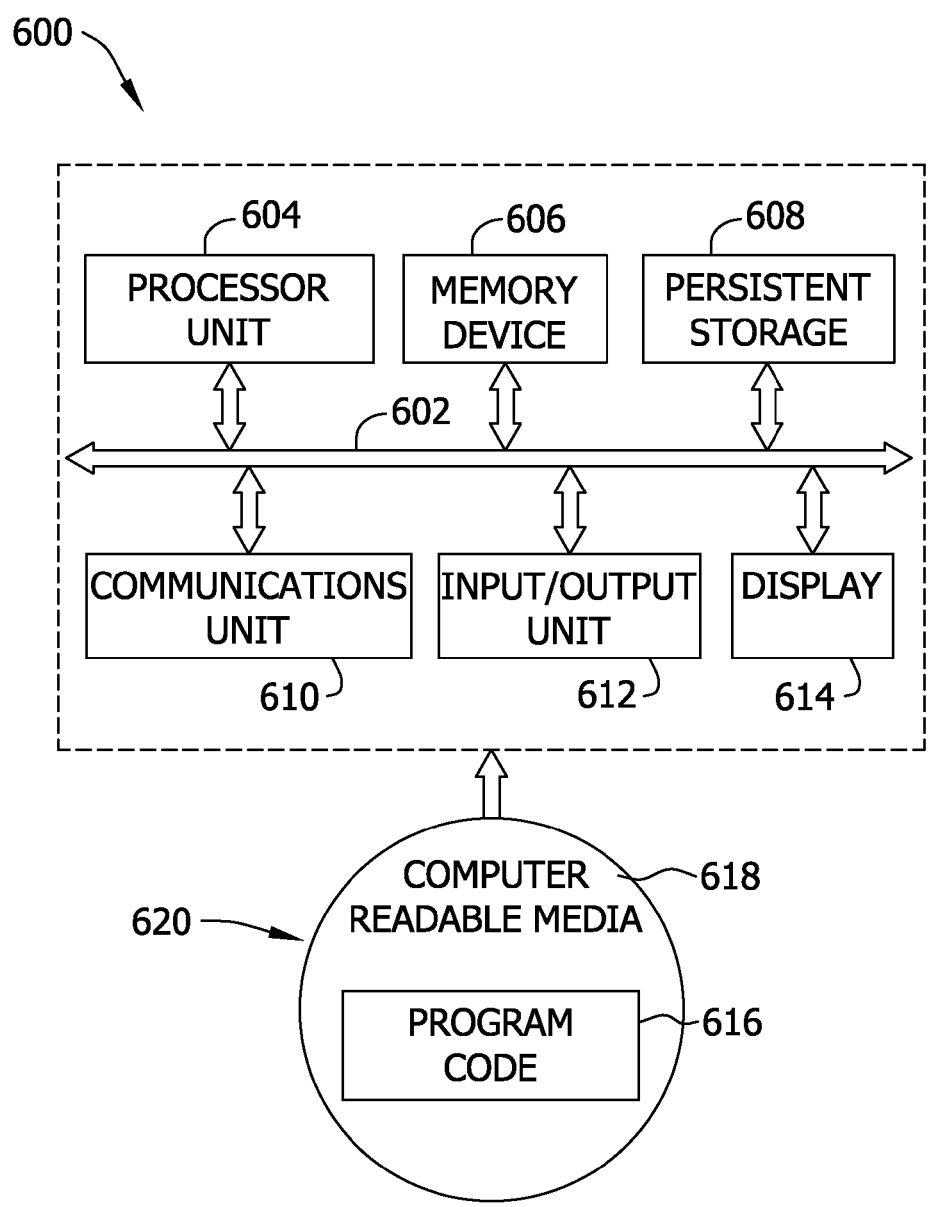
FIG. 7 is a diagram of a data processing system.

Turning now to FIG. 7, a diagram of a data processing system is depicted in accordance with an illustrative embodiment. Data processing system 600 is illustrative of both server and client machines. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, without limitation, a random access memory or any other suitable volatile or non-volatile storage device. Persistent storage 608 may take various forms depending on the particular implementation. For example, without limitation, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, without limitation, a removable hard drive may be used for persistent storage 608.

Communications unit 610, in these examples, provides for communications with other data processing systems or devices. In these examples, communications unit 610 is a network interface card or a plurality of network interface cards. As will be understood based on the embodiments described herein, data processing system 600, via communications unit 610 operates to forward the traffic received on a first interface back out to a network via a second interface. Communications unit 610 may provide communications through the use of either or both physical and wireless communication links.

Input/output unit 612 allows for input and output of data with other devices that may be connected to data processing system 600. For example, without limitation, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer readable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

In some illustrative embodiments, program code 616 may be downloaded over a network to persistent storage 608 from another device or data processing system for use within data processing system 600. For instance, program code stored in a computer readable storage medium in a server data processing system may be downloaded over a network from the server to data processing system 600. The data processing system providing program code 616 may be a server computer, a client computer, or some other device capable of storing and transmitting program code 616.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown.

As one example, a storage device in data processing system 600 is any hardware apparatus that may store data. Memory 606, persistent storage 608 and computer readable media 618 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 606 or a cache such as that found in an interface and memory controller hub that may be present in communications fabric 602.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for managing network traffic, the method comprising:
   receiving a traffic engineering specification at a Server from a Client associated with one or more Internet service provider (ISP) connections, wherein the traffic engineering specification includes an ISP connection identifier (ISP_ID) for each connection of the one or more ISP connections;
   receiving a communication at the Server, a destination of the communication being the Client; and
   sending the communication from the Server to the Client via a tunnel virtual interface configured over the one or more ISP connections associated with the Client based on the traffic engineering specification, the tunnel virtual interface being a point of connection to a tunnel virtual network link.

2. The method of claim 1 wherein receiving a traffic engineering specification comprises sending the traffic engineering specification by the Client to the Server.

3. The method of claim 1 wherein receiving a traffic engineering specification comprises sending performance characteristics for the ISP connections associated with the Client to the Server.

4. The method of claim 1 wherein receiving a traffic engineering specification comprises sending cost metrics for the ISP connections associated with the Client to the Server.

5. The method of claim 1 wherein the ISP connections associated with the client include at least one of a wireless network, a wired network, a cellular network, and a satellite network.

6. The method of claim 1 further comprising storing the received traffic engineering specification on the Server.

7. The method of claim 1 wherein receiving a communication at the Server comprises receiving the communication at the Server.

8. The method of claim 1 further comprising sending a traffic engineering specification from the Client to the Server in response to a detected change in the network.

9. The method of claim 1 wherein the tunnel virtual interface defined by the traffic engineering specification is different in the inbound and outbound directions.

10. A method for client configured network communications, said method comprising:
- creating a tunnel virtual interface from the Client to the Server;
- providing, from the Server to the Client, a Client Identifier (Client_ID);
- registering, from the Client to the Server, a set of ISP connection identifiers (ISP_IDs);
- providing, from the Client to the Server, a traffic engineering specification for network traffic to be directed to the Client; and
- configuring, at the Server, the network traffic destined for the Client according to the traffic engineering specification.

11. The method according to claim 10 wherein the traffic engineering specification includes one or more ISP connection identifiers along with their associated policies, costs, and traffic classes.

12. The method according to claim 10 further comprising:
- monitoring the network traffic for at least one of changes in performance, changes in cost, Internetwork address changes, new ISP connections gained, and existing ISP connections lost; and
- updating the traffic engineering specification within the Server when an ISP connection profile changes.

13. The method according to claim 10 wherein network traffic to be directed to the Client and the network traffic destined for the Client comprise different ISP paths, based on the traffic engineering specification.

14. The method according to claim 10 wherein:
- registering a Client's ISP connections with a Server comprises assigning the Client a Client_ID, and the Client providing the Server with one or more ISP_IDs; and
- creating a tunnel virtual interface from the Client to the Server comprises providing the Client Identifier and ISP Identifiers as additional tunnel encapsulation header fields in each packet exchanged between the Client and Server so that packets can be unambiguously associated with Client/Server registration.

15. The method according to claim 10 wherein the Client_ID and ISP IDs associated with the Client remain stable during dynamic changes of the Client's ISP connection network layer addresses.

16. A computer network comprising:
- a Client associated with one or more Internet service provider (ISP) connections; and
- a Server configured to:
  - receive a traffic engineering specification from said Client, wherein the traffic engineering specification includes an ISP connection identifier (ISP_ID) for each connection of the one or more ISP connections;
  - receive a communication, via the Internetwork, a destination of the communication being said Client; and
  - send the communication to said Client via a tunnel virtual interface configured over the one or more of the ISP connections associated with said Client based on the traffic engineering specification, wherein the tunnel virtual interface is a point of connection to a tunnel virtual network link.

17. The computer network of claim 16 wherein to receive a traffic engineering specification, said Client is configured to send one or more of a specification for ISP connections associated with said Client to said Server, performance characteristics for ISP connections associated with said Client to said Server, send cost metrics for ISP connections associated with said Client to said Server.

18. The computer network of claim 16 wherein the ISP connections are between a Client and at least one of a wireless network, a wired network, a cellular network, and a satellite network.

19. The computer network of claim 16 wherein communications between said Server and said Client are performed via a tunnel virtual network link.

20. The computer network of claim 16 wherein said Client is configured to send an updated traffic engineering specification to said Server in response to a detected change in said computer network.

21. The computer network of claim 16 wherein to receive a traffic engineering specification, said Client is configured to provide the traffic engineering specification to said Server over available ISP connections.

22. The computer network of claim 16 wherein said Client is configured to send an updated traffic engineering specification to said Server based on detected changes in ISP connectivity.

23. The computer network of claim 16 wherein said Client operates to instruct said Server how to communicate with said Client over the various ISP connections available to said Client.

24. The computer network of claim 16 wherein:
- said server is further configured to assign said Client a Client Identifier; and
- said server is further configured to provide the Client Identifier and ISP Identifiers as additional tunnel encapsulation header fields in each packet exchanged between said Client and said Server so that packets can be unambiguously associated with Client/Server registration.

* * * * *